May 12, 1970  W. N. OSWALD  3,511,400
NESTABLE, CORRUGATED FORKLIFT AND SLING PALLET
Original Filed May 22, 1967  5 Sheets-Sheet 1
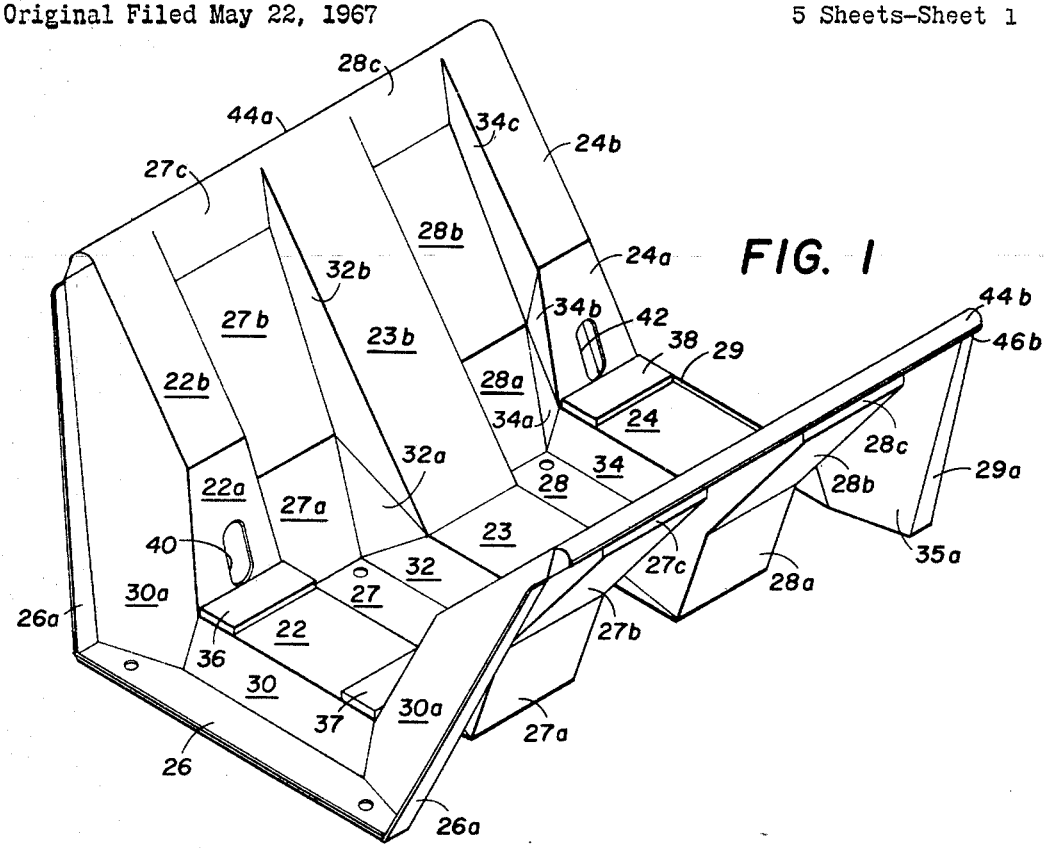
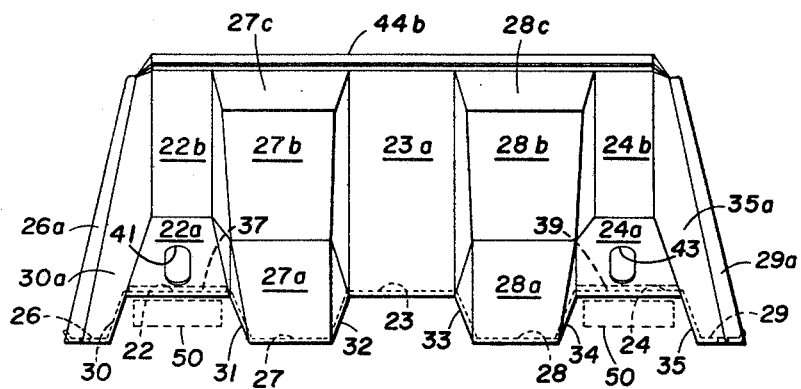
INVENTOR:
WILLIAM N. OSWALD
Richards, Harris & Hubbard
ATTORNEY May 12, 1970     W. N. OSWALD     3,511,400
NESTABLE, CORRUGATED FORKLIFT AND SLING PALLET
Original Filed May 22, 1967     5 Sheets-Sheet 3
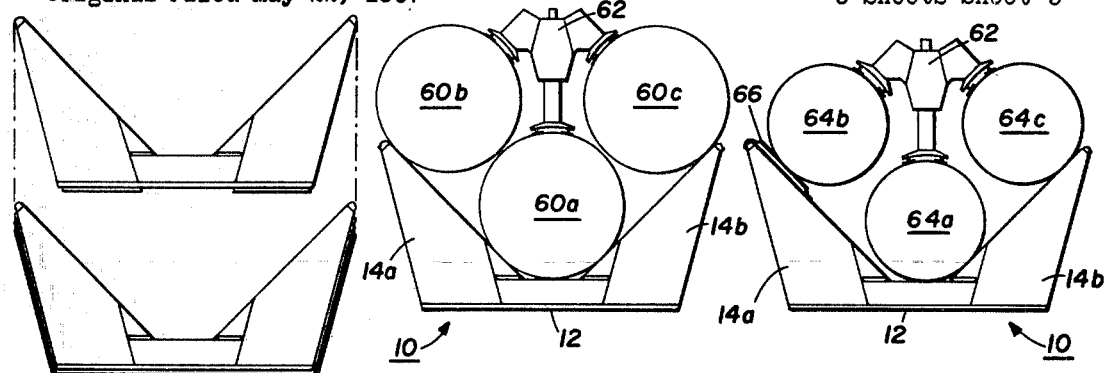
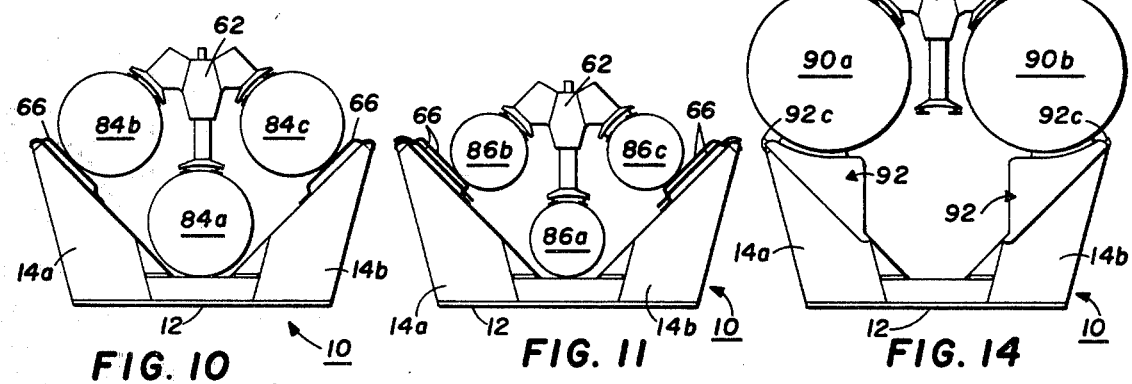
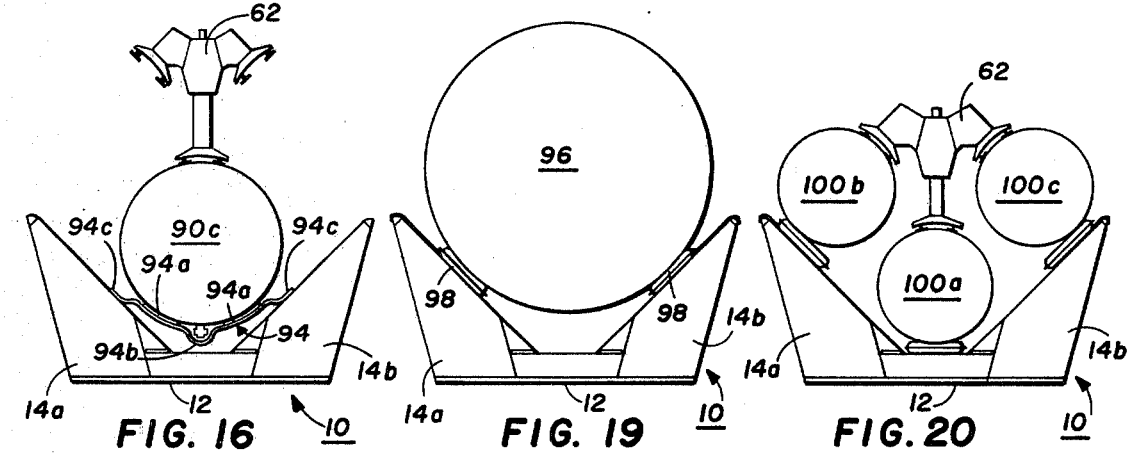
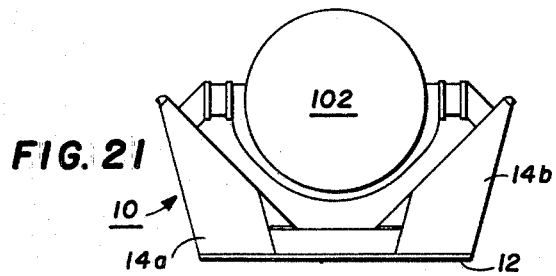
INVENTOR:
WILLIAM N. OSWALD
Richards, Harris & Hubbard
ATTORNEY May 12, 1970     W. N. OSWALD     3,511,400
NESTABLE, CORRUGATED FORKLIFT AND SLING PALLET
Original Filed May 22, 1967     5 Sheets-Sheet 2

INVENTOR:

WILLIAM N. OSWALD

Richards, Harris & Hubbard

ATTORNEY

May 12, 1970 W. N. OSWALD 3,511,400
NESTABLE, CORRUGATED FORKLIFT AND SLING PALLET
Original Filed May 22, 1967 5 Sheets-Sheet 4
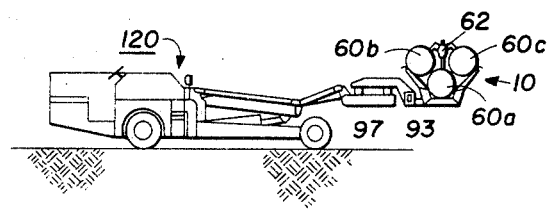
FIG. 22
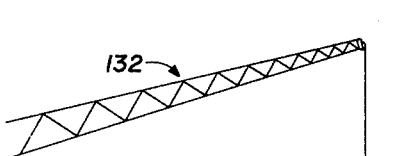
FIG. 25
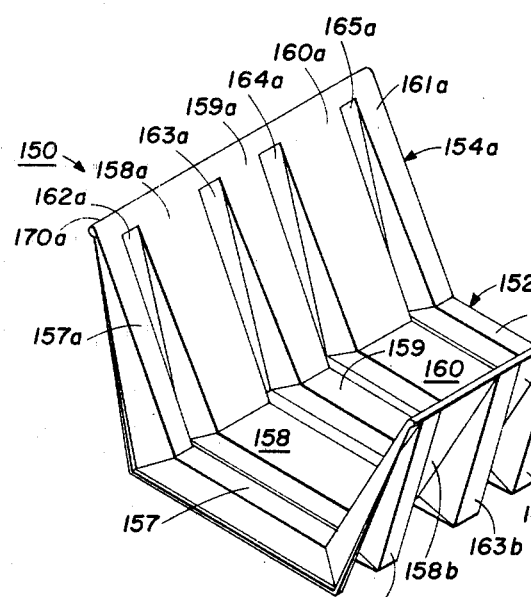
FIG. 26
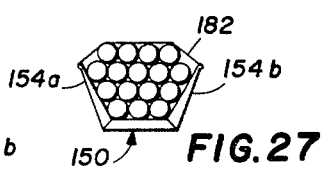
FIG. 27
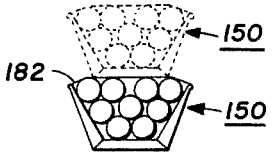
FIG. 28
FIG. 29
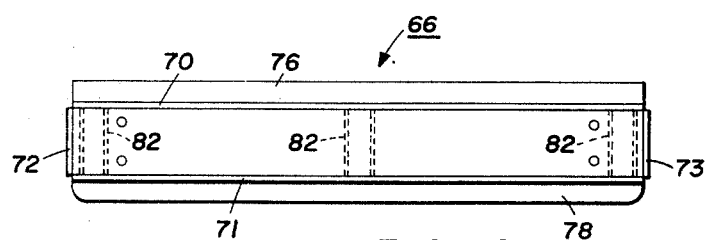
FIG. 12
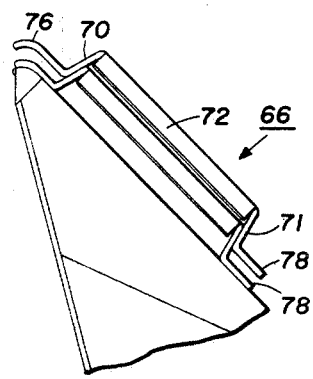
FIG. 13
INVENTOR:
WILLIAM N. OSWALD
Richards, Harris & Hubbard
ATTORNEY May 12, 1970 W. N. OSWALD 3,511,400
NESTABLE, CORRUGATED FORKLIFT AND SLING PALLET
Original Filed May 22, 1967 5 Sheets-Sheet 3
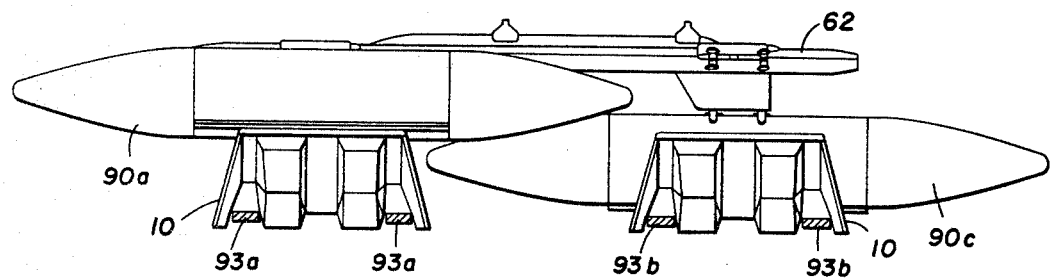
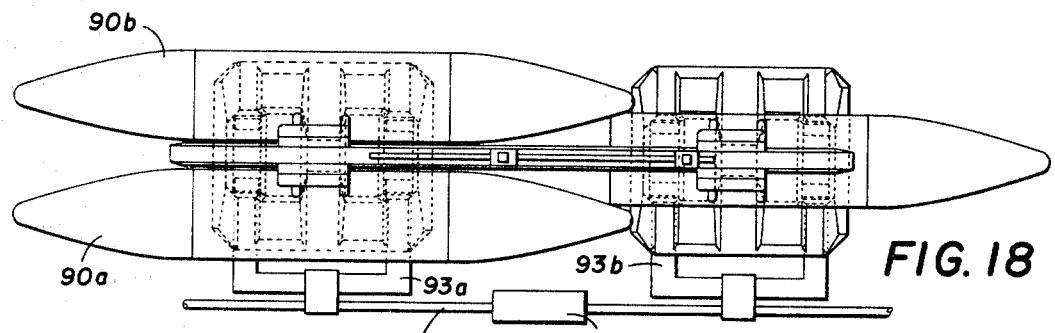
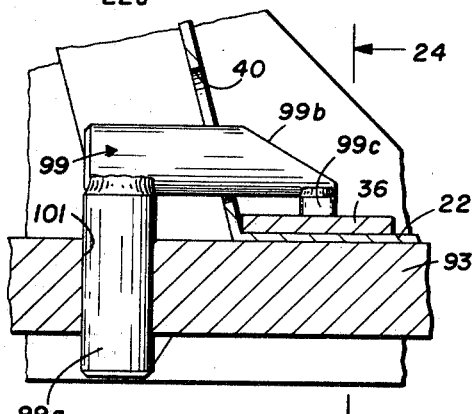
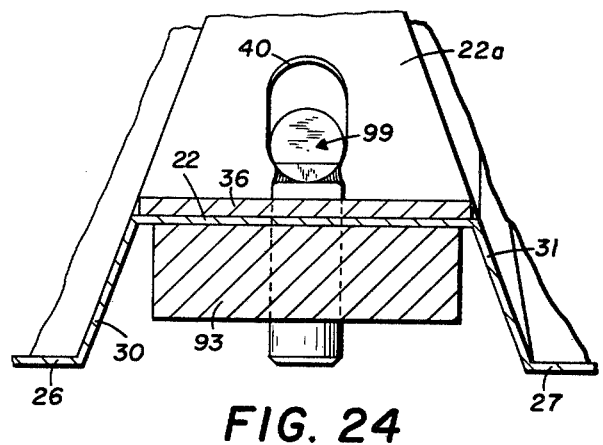
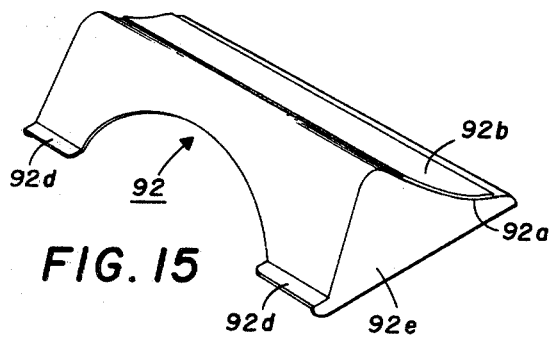
INVENTOR
WILLIAM N. OSWALD
Richards, Harris & Hubbard
ATTORNEY

United States Patent Office 3,511,400
Patented May 12, 1970

3,511,400
NESTABLE, CORRUGATED FORKLIFT AND SLING PALLET
William N. Oswald, Dallas, Tex., assignor to Standard Manufacturing Company, Inc., Dallas, Tex., a corporation of Texas
Original application May 22, 1967, Ser. No. 639,946, now Patent No. 3,430,586. Divided and this application Feb. 3, 1969, Ser. No. 796,140
Int. Cl. B66f 9/12
U.S. Cl. 214—621                3 Claims

ABSTRACT OF THE DISCLOSURE

A material handling system for airborne ordnance such as bombs, rockets, and napalm which is carried on externally mounted, multiple weapon racks including a general purpose, lightweight cardle formed from a unitary sheet that is corrugated for strength and fully nestable to conserve space. A number of accessories are also disclosed for use with the cradle so that the cradle can be adapted to handle substantially all weapons now used by tactical aircraft.

---

This application is a division of application Ser. No. 639,946, filed May 22, 1967, now Pat. No. 3,430,586.

BACKGROUND OF THE INVENTION

This invention relates generally to forklift pallets for handling one or more objects, and more particularly, but not by way of limitation, relates to a lightweight, fully nestable cradle for handling and transporting airborne weapons such as bombs, rockets, cylindrical tanks and the like from the time the weapons leave the factory until the weapons are loaded on the aircraft at a forward base of operations.

Logistical support of a modern tactical air force, whether land or sea based, requires the transportation of very large quantities of airborne ordnance from factories located in a friendly country to forward bases of operations for the aircraft, usually in a foreign country. The airborne ordnance includes a variety of bombs, rockets, napalm tanks, etc. which vary widely in size and weight. Perhaps the most typical weapons are bombs which vary in size from 250 pounds up to 1000 pounds. These bombs are usually transported in bulk quantities from the factory to a storage depot in a disassembled condition, and are normally stored in this condition prior to use. Before use, the bombs are transported to prestaging areas or to a carrier where they are assembled and loaded on an external, jettisonable bomb rack which is subsequently mounted under the wings or fuselage of the aircraft. One type of rack, called a TER, can support three bombs arranged in a triangular configuration with one below and one on each side of the rack. The bombs can then be dropped in sequence from the rack, and the rack itself can be jettisoned in an emergency. Another type of rack, called an MER, can support two clusters of three bombs arranged in tandem. After being loaded, the racks can then be transported to the parked aircraft and the weapons loaded onto the aircraft merely by connecting the rack to the aircraft. The loaded racks are particularly difficult to handle because of the triangular shape of the cluster of weapons and its basic instability. Loading is further complicated by the fact that the wings of the aircraft are so low to the ground that the lowermost weapon of the cluster clears the ground by only a few inches after the rack has been attached to the aircraft.

The TER and MER racks loaded with the weapons have heretofore been transported from the prestaging area to the aircraft on a cradle specially designed to support the weapons with the rack disposed in the proper upright position for attachment to the aircraft. The prior cradles were designed to be handled by a forklift so that the cradles could be loaded on a flatbed trailer and transported from the prestaging area to the aircraft. Then a specially designed, low profile forklift truck would either lift the cradle from the trailer and position it under the aircraft so that the rack could be attached in place, or pick the rack and weapons from the cradle and position only the rack and weapons under the aircraft. After the weapons were attached to the aircraft, the cradle was too heavy to be removed from under the bombs manually and had to be removed by the forklift vehicle. Before this could be accomplished, however, the side of the cradle had to be lowered so that the cradle would clear the low hanging weapons. This was not only a time consuming procedure, but required that the cradles be mechanically complex which increased the weight and cost of the cradles.

In order to achieve the desired mobility, all support equipment essential to operations of the aircraft must be transportable by air. For this reason, the weight of the cradles and total volume when stacked is of the utmost importance. Since the cradles must be used in large quantities, initial cost, versatility and useful life are also very important.

As previously mentioned, the weapons are normally transported in bulk, partially disassembled, from the factory to storage and prestaging areas located at the forward base of operations. Palletization of a number of like weapons facilitates handling of the weapons between the factory and the prestaging storage area, provided the pallets can be handled by a forklift vehicle or by a sling harness. However, pallets used for this purpose must be returned empty to the factory in large numbers. Accordingly, the weight and stacked volume of the pallets is of prime importance, whether returned by an aircraft or by a ship.

Similar problems are inherent in handling a wide variety of other materials and products within and around the fabricating plants and during transport to the site of ultimate use. For example, elongated generally cylindrical objects such as logs, posts, pipe, compressed gas cylinders, etc. and bundles of metal bars, angles, tubing, etc. cannot conveniently be handled by forklift. Similarly, relatively small objects such as pipe couplings, castings, forgings, plastic parts, etc., as well as powdered and particulate fluids such as grains and certain chemicals cannot be easily handled by the forklift unless placed in a container. Thus, although the specific embodiments of this invention which will hereafter be described in detail are specifically designed for and are particularly applicable to the handling of airborne ordnance, it is to be understood that the invention also has broad commercial applications in materiel handling generally.

SUMMARY OF INVENTION CLAIMED

A pallet or cradle formed by a corrugated unitary sheet that is conformed to provide a base portion and at least one side portion. The side portion extends at an angle from a longitudinally extending edge of the base portion. A plurality of common corrugations extend transversely of the base portion and the side portion. The corrugations tend to stiffen the pallet against bending moments acting generally about the longitudinal axis and also rigidify the angles between the base portion and the side portion. The angular relationship between the side portion and the base portion tends to stiffen the pallet against bending moments acting generally about the transverse axis. This structure provides a cradle formed from a relatively thin sheet of aluminum which can support loads many times, typically fifty or sixty times, the weight of the cradle. Two of the corrugations are so sized and spaced as to receive the fork of a forklift vehicle, and the pallet may be raised by a three or four hook sling attached to the outer edges of the pallet or cradle. In order to make the cradle fully nestable, all portions of the sheet are disposed either horizontally or at an angle to the vertical. As a result, one pallet can be nested in another and the total height increased by only slightly more than the thickness of the sheet.

By providing such a cradle with a V-shaped configuration, the cradle is capable of handling substantially all presently used airborne weapons, singly or in clusters, to transporting the weapons from the prestaging area and attaching them to the aircraft. The cradle has sufficient strength to carry several thousand pounds, yet is sufficiently light to be easily handled by one man, can be handled either by forklift or a sling harness, may be stacked in nested relationship with other cradles when empty to occupy a minimum volume, is relatively inexpensive to fabricate, has no moving parts, and has a long and reliable useful life. In another embodiment, the cradle may be used for transporting weapons in bulk form the prestaging area to the factory with substantially the same advantages.

BRIEF DESCRIPTION OF THE DRAWINGS

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

FIG. 1 is a perspective view of a cradle constructed in accordance with the present invention;

FIG. 2 is an end view of the cradle of FIG. 1;

FIG. 4 is a side view of the cradle of FIG. 1;

FIG. 7 is a somewhat schematic end view of a plurality of the cradles of FIG. 1 stacked in nesting relationship;

FIGS. 8–11 are somewhat schematic end views illustrating how the cradle of FIG. 1 may be used for handling clusters of bombs of different sizes using an adapter;

FIG. 12 is a plan view of one of the adapters illustrated in FIGS. 9–11;

FIG. 13 is an end view of the adapter of FIG. 12;

FIG. 14 is an end view illustrating how the cradle of FIG. 1 may be adapted to handle thin skinned fire bombs;

FIG. 15 is a perspective view of one of the shoulder chocks illustrated in FIG. 14;

FIG. 16 is an end view illustrating how the cradle of FIG. 1 may be adapted to handle a single fire bomb;

FIG. 17 is a side elevation illustrating how a pair of the cradles of FIG. 1 may be used to handle three fire bombs mounted on an MER rack;

FIG. 18 is a top view of the assembly shown in FIG. 17;

FIGS. 19–21 are somewhat schematic end views illustrating how the cradle of FIG. 1 may be adapted to handle still other types of weapons;

FIG. 22 is a somewhat schematic drawing illustrating the manner in which the cradle of FIG. 1 may be handled using a forklift vehicle;

FIG. 23 is a sectional view of a hold down hook which may be used to hold a loaded cradle on the fork of a lift truck;

FIG. 24 is a sectional view taken substantially on lines 24—24 of FIG. 23;

FIG. 25 is a somewhat schematic diagram illustrating how the cradle of FIG. 1 may be handled using a sling;

FIG. 26 is a perspective view of another cradle constructed in accordance with the present invention for handling ordnance in bulk form; and FIGS. 27–29 are somewhat schematic end views illustrating how the cradle of FIG. 26 may be used to handle various diameter weapons in bulk.

DESCRIPTION OF PREFERRED EMBODIMENTS

Figure 3:
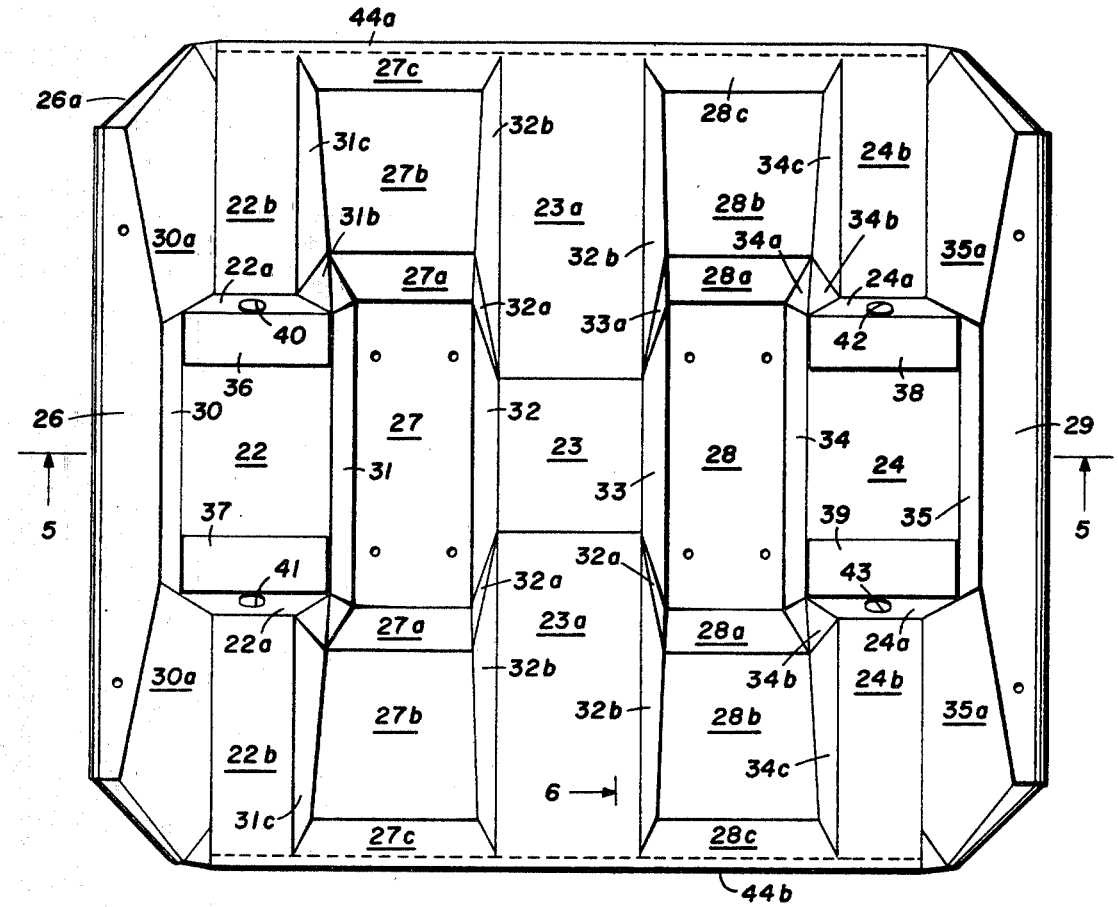
FIG. 3 is a plan view of the cradle of FIG. 1.

Referring now to the drawings, a cradle constructed in accordance with the present invention is indicated generally by the reference numeral 10 in FIGS. 1–4. The cradle 10 is comprised of a unitary sheet of material conformed to provide a generally rectangular, generally planar base portion, indicated generally by the reference numeral 12, and a pair of side portions, indicated generally by the reference numerals 14a and 14b, which extend upwardly and outwardly at angles from the opposite longitudinally extending edges of the base portion 12.

The unitary sheet is typically of the same thickness throughout, and is very thin in comparison with its length and width dimensions and therefore would normally have a relatively low flexure strength. In the specific embodiment of the invention herein described, for example, the cradle would have dimensions of about 3 ft. by 3 ft. in the plan view of FIG. 3, and would be fabricated from 12 or 13 gauge steel ranging in thickness from 0.104 inch down to 0.0897 inch, or 11 gauge aluminum, which is 0.1196 inch thick. Using these materials, the cradle would be capable of handling loads of several thousand pounds, as will hereafter become more evident, yet would weigh less than 100 pounds when made of sheet steel and less than 60 pounds when made of sheet aluminum. The unitary sheet may initially be a single sheet of material, stamped, drawn or formed into the shape illustrated, or may be formed by welding a number of subparts together. Within the broader aspects of the invention, the cradle could be formed from fiber glass, plastic or any other suitable material besides metal, including laminated, sandwich or honeycomb type construction as appropriate. As used herein, the term unitary is intended to means a securely interconnected sheet having generally the same thickness throughout.

Figure 5:
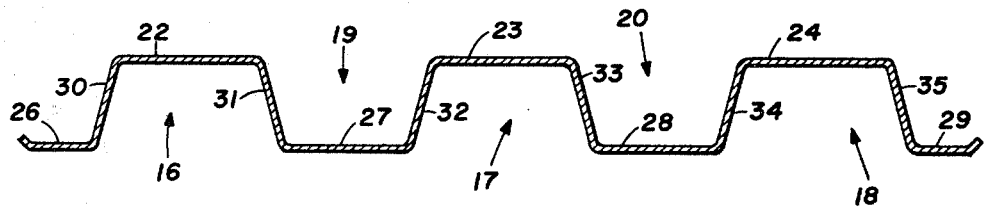
FIG. 5 is a sectional view taken substantially on lines 5—5 of FIG. 3.

A plurality of corrugations are formed transversely of the longitudinal axis of the cradle and extend through the base portion 12 and continue into both side portions 14a and 14b so as to be considered common to all three portions. Referring to the sectional view of FIG. 5, it will be noted that the corrugations are formed by three downwardly facing channels 16, 17 and 18 and two upwardly facing channels 19 and 20. These channels are formed by upper plates 22, 23 and 24, lower plates 26–29, and interconnecting web portions 30–35. The lower plates 26–29 are disposed in a common plane and generally form a supporting surface for the cradle.

The upper plates 22–24 are spaced vertically above the lower plate 26–29 so that the lower surfaces of the upper plates 22–24 are adapted to receive the fork 50 of a forklift vehicle as shown in dotted outline in FIG. 4. The upper surfaces of the upper plates are also disposed in a common plane and provide a support surface for the load carried by the cradle. The two outer lower plates 26 and 29 are substantially longer than the inner lower plates 27 and 28 in the transverse direction in order to provide a broader base for the cradle in the transverse direction and thereby provide greater lateral stability.

Figure 6:
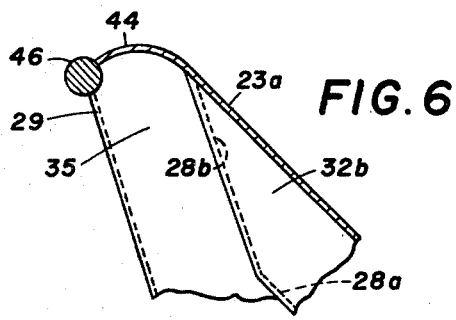
FIG. 6 is a sectional view taken substantially on lines 6—6 of FIG. 3.

Plate 26 continues upwardly as side plates 26a of the side portions 14a and 14b. Similarly, lower plate 29 continues as side plates 29a of side portions 14a and 14b. The same reference character scheme is usde to show the continuations of the other lower plates 27 and 28, the upper plates 22–24, and the web portions 30–35. Thus for example, the lower plates 27 and 28 have continuations 27a, 27b and 27c, and continuations 28a, 28b and 28c, respectively, in both side portions 14a and 14b. Upper plates 22 and 24 have continuations 22a and 22b, and 24a and 24b, respectively, in both side portions 14a and 14b. The center upper plate 23 has continuations 23a in each of the side portions 14a and 14b. Web portions 31 and 34 continue as multifacet plates 31a, 31b and 31c and plates 34a, 34b and 34c, respectively, in each of the side portions 14a and 14b. The two web portions 32 and 33 have continuations 32a and 32b, and 33a and 33b, respectively, in each of the side portions. The extreme portions 22b, 23a, and 24b of the upper plate portions 22–24, and the extreme portions 27c and 28c of the lower plate portions 27 and 28 in both side portions 14a and 14b all terminate in common, arcuately downturned flange portions 44a and 44b (see FIG. 6) which extend along the outer edges of the side portions 14a and 14b, respectively. Enlarged beads 46a and 46b are preferably formed along the entire length of the margin of each of the downturned flanges 44a and 44b, respectively. The outermost edges 30a and 35a of the two outer web portions 30 and 35 are preferably connected to the ends of the arcuate flange portions 44a and 44b to assist in rigidifying the structure as will presently be described.

As a result of the various corrugations and flanges, the cradle 10 has great strength and rigidity. The transverse corrugations tend to stiffen the base portion 12 and both side portions 14a and 14b to resist bending moments acting generally about the longitudinal axes of the cradle. Since the corrugations of the side portions 14a and 14b are comon continuations of the corrugations of the base portion 12, the angles between the base portion and the two side portions are rigidified with great strength so that the side portions 14a and 14b can support very substantial loads. In addition, the angular relationship between the side portions 14a and 14b and the base portion 12 tends to rigidify the cradles against bending moments acting about any transverse axis. The flange portions 44a and 44b and bead portions 46a and 46b further rigidify the side portions of the cradle 10 against bending moments about transverse axes. By connecting the outer margin of the end web portions 30a and 35b to the ends of the flange portions 44a and 44b, the cradle is stiffened against bending moments about the two diagonal axes interconnecting the opposite corners of the cradles.

It will be noted that the corrugations are not necessarily uniform. In particular, it will be noted that the lower plates 26 and 29 are substantially longer than the adjacent plates 22–24, and thus provide a wide, stable supporting base for the cradle and its load. The center plate 23 is relatively narrow so that the ext ensions 23a form a relatively narrow V suitable for aligning the center weapon of a cluster as will presently be described. The continuations 23a of the center upper plate 23 and the continuations 22b and 24b of the two outboard upper plates 22 and 24 lie in the same plane to provide a common supporting surface for the load. However, the two outboard plates 22 and 24 are made substantially longer than the center plate 23 in order to provide a flat bearing surface of maximum transverse width and area for receiving the fork 50 of a forklift vehicle, as illustrated by the dotted outlines in FIG. 4, and as illustrated generally in FIG. 22. The increased transverse width of the plates 22 and 24 increases the lateral stability of the cradle when it is supported by the fork. The flanges 44a and 44b and beads 46a and 46b provide very convenient handles for handling the cradles manually, and have sufficient strength to permit the cradle to be lifted, when fully loaded, by a sling having four hooks which may be connected under the flanges 44a and 44b at the four corners of the cradle, as illustrated generally in FIG. 25.

In accordance with another important aspect of the invention, the cradle 10 is conformed so that a plurality of the cradles can be stacked in nested relationship substantially as illustrated in FIG. 7. In order to achieve nesting, it is important that no two symmetrical portions of the cradle be disposed in parallel relationship. For this reason, all facets of the upper surface of the sheet making up the cradle 10 are preferably disposed either horizontally or at an oblique angle to the horizontal. In fact, at this time an angle of about 108° is considered to be the minimum practical oblique angle in order to avoid the possibility that the cradles will be wedged together when stacked in nested relationship. Thus, the upper surfaces of all of the web portions 30–35, and the continuations of the upper and lower plates 22–24 and 26–29 into the side portions 14a and 14b are disposed at an oblique angle to the adjacent upper surfaces of the sheet that lie in a horizontal plane. In addition, spacer plates 36–39 are secured on the top surface of plates 22 and 24 to insure that each cradle in a nested stack is supported on the plates 36–39 of the underlying cradle, rather than by the inclined surfaces of the upper cradle resting on the inclined surfaces of the underlying cradle. This decreases the possibility that two of the pallets might become wedged together if either were bent out of shape during use and then placed in a stack and subjected to the weight of a number of other cradles. In addition, the plates 36–39 are positioned adjacent openings 40–43, respectively, so that hold down hooks can be inserted through the openings and engage the pads as hereafter described.

The cradle 10 is designed to accommodate substantially all tactical airborne weapons presently used by the United States, either singly or in clusters on either a TER or MER jettisonable external weapons rack merely by using a few adapter accessories. FIG. 8 illustrates a standard cluster of three 750# bombs 60a–60c secured in position on a standard, externally mounted, jettisonable weapons rack 62. It will be noted that the lowermost or center bomb 60a is supported by plates 22–24, and is centered by side plates 23a. The two upper and outer bombs 60b and 60c are each supported by side plates 22b, 23a and 24b adjacent the top of the side portions 14a and 14b.

In FIG. 9, three bombs 64a–64c of the next smaller diameter, typically 1000#, are loaded on the rack 62 and supported by a cradle 10 using a single adapter chock 66. As a result, the lower weapon 64a rests on the plates 22–24 and weapons 64a and 64c are urged against side portion 14b by the adapter chock 66 placed on side portion 14a. The adapter chock 66 is illustrated in plan view in FIG. 12 and two chocks are shown stacked in the end view of FIG. 13. The chock 66 is a generally rectangular, relatively shallow inverted pan which extends the length of the side portion 14a. The chocks 66 may be formed from sheet metal bent to provide upper and lower sides 70 and 71 and opposite ends 72 and 73. A flange portion 76 extends from the upper side 70 and conforms to the arcuate flanges 44a and 44b on the side portions 14a and 14b to prevent the adapter from sliding down the face of the side portion to which it is attached. A load supporting flange 78 extends from the margin of the other side wall 71. The two end walls 72 and 73 are positioned to positively locate one chock in nested relationship on top of another chock as shown in FIG. 13. The chock has three spacers 80 inside the pan which prevent the chocks from fully nesting. As a result, two stacked chocks produce a total height less than twice the height of a single chock.

FIG. 10 illustrates a cluster of three smaller weapons 84a–84c, typically 500# bombs, mounted on the external rack 62. In this case, one of the adapter chocks 66 is placed on each of the side portions 14a and 14b to properly support the cluster in the necessary upright position. FIG. 11 shows the use of two chocks 66 on each of the side portions 14a and 14b to support a cluster of three weapons 86a–86c, typically 250# bombs.

FIG. 14 illustrates the manner in which the cradle 10 may be adapted to support a pair of thin skinned fire bombs affixed to the side position of either a TER or MER rack 62 by means of shoulder chocks 92. One of the shoulder chocks 92 is shown in the perspective view of FIG. 14 and is comprised of a unitary sheet of material such as aluminum having an arcuate upper surface 92a to which is affixed a resilient neoprene pad 92b. The upper end of the chock 92 has hooks 92c which are secured over the edge 44 of pallet 10 and has feet 92d which rest on surfaces 22b and 24b of the cradle 10. End walls 92e of the chock 92 have the same slope as end walls 30a and 35a of the cradle 10 and are positioned to engage the end walls of the cradle so as to hold the chock 92 in position longitudinally of the cradle.

FIG. 16 illustrates how the cradle 10 may be adapted to support a single thin skinned fire bomb 90c by means of an adapter 94. The adapter 94 has a cross section as illustrated in FIG. 16 and is substantially the same length as the distance between surfaces 30a and 35a of the cradle 10. The adapter 94 has a pair of neoprene pads 94a which are bonded to arcuate segments of the adapter 94 having a radius of curvature selected to mate with that of the fire bomb 90c. A channel portion 94b receives the seam of the fire bomb, and feet portions 94c rest on surfaces 22b, 23a and 24b of the cradle 10. It will be noted that the fire bomb 90c is suspended from the center position of the TER or MER rack 62.

FIGS. 17 and 18 illustrate how a pair of the cradles 10 may be used to support weapons loaded on an MER rack, and in particular how an MER rack having three fire bombs thereon can be handled. Because of the excess length of the fire bombs, it is customary to suspend a single fire bomb 90c from the front lower or center position of the MER rack 62 in the manner shown in FIG. 16, and a pair of fire bombs 90a and 90b from the two side positions at the rear of the MER rack in the manner shown in FIG. 14. The rear weapons 90a and 90b are then supported by a cradle 10 with the adapters 92 as shown in FIG. 14, and the forward weapon 90c supported by a cradle 10 and the adapter 94 as shown in FIG. 16. The two cradles may then be simultaneously lifted by a pair of forks 93a and 93b connected to a common bar 95, which in turn is supported by the lift table 97 of a forklift vehicle. Two of the cradles 10 may be used in the same general manner to handle an MER rack loaded with six weapons of substantially any type.

FIG. 19 illustrates the use of a cradle 10 to support a single, large thin skinned weapon 96, such as a napalm bomb, by means of a pair of air pillows 98 each suspended on one of the side portions 14a and 14b by a strap and hook extending over the respective flange portions 44a and 44b.

FIG. 20 illustrates the use of a cradle 10 to support a cluster of three thin skinned weapons 100a–100c on three air pillows 98. In this case, an air pillow is placed between each of the thin skinned weapons and the cradle 10. Small thin skinned weapons may be handled using a combination of chocks 66 and air pillows 98.

FIG. 21 illustrates the use of a cradle 10 to support a single special purpose weapon 102 by means of a shear pad adapter 104 which rests on the side portions 14a and 14b.

After the weapons have been assembled and secured on the external rack 62 in the desired configuration at the prestaging area and loaded on a cradle 10 as illustrated in FIGS. 8–11, 14 and 16–21, the cradle 10 may then be handled using a standard forklift vehicle to load the cradle onto a flatbed trailer for transport to the aircraft. At the aircraft, a special purpose, low profile forklift vehicle, such as the vehicle 120 in FIG. 22, may then be used to remove the loaded cradle from the flatbed trailer and position both the cradle and weapon cluster under an aircraft such that the external rack 62 can be made secure to the aircraft.

The cradles 10 may be secured on the fork 93 to prevent the top heavy load from toppling over by means of four hold down hooks, one of which is indicated generally by the reference numeral 99 in FIGS. 23 and 24. Each hook 99 has a cylindrical shank portion 99a which is closely received in a vertical bore 101 through the fork 93. An arm portion 99b is rigidly connected at 90° to the shank portion 99a, and a foot portion 99c is connected to the end of the arm portion 99b. The arm portion 99b extends through the openings 40 and engages the upper surface of the pad 36. The opening 40 is sufficiently high to permit the shank 99a to be inserted in the bore 101 after the arm portion 99b has been inserted through the opening 40. If the cradle should tend to tip over, an upwardly directed force will be applied to the foot 99c which will exert a bending moment on the shank 99a and thereby securely wedge the shank portion 99a against the opposite edges of the bore 101. The hooks 99 are effective even when a forklift truck carrying a fully loaded cradle is brought to an abrupt halt when traveling at high speed.

In most cases, after the weapon cluster has been secured under the aircraft, the lowermost weapon 60a will clear the ground by a distance substantially less than the overall height of the cradle 10. However, the cradle can be lowered to the ground and the fork of the vehicle 120 removed from under the cradle. The cradle 10 is sufficiently lightweight that it can then be manually skidded longitudinally along the ground and removed from beneath the weapon cluster. The cradles 10 may then be manually loaded back on the transport back to the prestaging area. The manual handling of the cradles, as opposed to handling the heavy cradles heretofore used by the forklift, greatly simplifiers and speeds up the process of arming the aircraft. As previously mentioned, the loaded cradle 10 can also be handled using a four hook sling 130 on the hoist line of a crane represented at 132 in FIG. 25. The four hooks of the sling may be attached under the flanges 44a and 44b at the four corners of the cradle.

Another cradle constructed in accordance with the present invention is indicated generally by the reference numeral 150 in FIG. 26. The cradle 150 is similar to the cradle 10 in that it is formed from a unitary sheet of relatively thin material. The cradle 150 has a base portion indicated generally by the reference numeral 152 which is substantially rectangular in shape, and a pair of side portions 154a and 154b which extend outwardly and upwardly from the opposite longitudinally extending edges of the base portion 152. Common corrugations extend transversely across the base portion 152 and up each of the side portions 154a and 154b substantially as heretofore described in connection with the cradle 10. However, in the cradle 150, the upper plates 157–161 of the base portion are all of substantially the same length and lie in the same plane. The lower plate portions, which are not shown in FIG. 26, also lie in the same plane and provide a support surface for the pallet. Similarly, the extensions 157a–161a of the upper plate portions 157–161, which form the load support surfaces of the side portion 154a, lie in a common plane, preferably disposed at an oblique angle of 150° to the upper plates 157–161 of the base portion 152 as do the corresponding plates 157b–161b of side portion 154b. The plates 162a–165a, which extend from the bottom plates of the base portion 152 into side portion 154a, also lie in a common plane as do plates 162b–165b of side portion 154b, and the planes are disposed at oblique angles less than 150° to the horizontal plane of the base portion 152 so as to intersect the planes of the upper plate extensions 157a–161a and 157b–161b. All of the plate portions 157a–165a then join to form common downturned flange portion 170a along the longitudinal margin of the side portion 154a that is similar to the flange portion 44a of the cradle 10. The extensions 157b–165b similarly terminate in a common downturned flange portion 170b extending along the outer portion of side portion 154b.

The cradle 150 is also formed so as to be stacked in closely nested relationship with other cradles. Thus, all surfaces of the sheet of material are disposed either in the horizontal plane or at an oblique angle to any adjacent horizontal portion. The pallets 150 can then be stacked in close nesting relationship in substantially the same manner as illustrated in FIG. 7. Also, the upper plates 157–161 are disposed above the lower plates by a distance sufficient to permit the fork of a forklift vehicle to be inserted under plates 158 and 160 while the pallet is resting on a flat surface. The corrugations stiffen the pallet against bending moments acting about the longitudinal axis of the cradle. Since the corrugations are also common to both the base 152 and sides 154a and 154b, i.e., the corrugations continue from the base into the sides, the angle between the sides and the base is rigidified with substantial strength. As a result of the angular relationship of the sides and the base, the cradle is also rigidified aginst bending moments acting about and transverse the axis of the cradle. The cradle 150 can also be raised in the manner illustrated in FIG. 25 by a sling harness having four hooks attached to the flanges 170a and 170b at the four corners of the cradle.

The cradle 150 may be used to transport generally elongated, cylindrical weapons, usually in disassembled form, in bulk form from the factory to the prestaging area. The cradle 150 is preferably dimensioned so that either three 500# bombs or two 1000# bombs may be laid in side-by-side relationship on the base portion 152 between the side portions 154a and 154b, substantially as illustrated in FIGS. 27 and 28, respectively. By placing the supporting surfaces 157a–161a at 150° to the surfaces 157–161, each successive layer will accommodate one more weapon as illustrated. The 750# bombs, or any other weapons desired, may be arranged somewhat randomly as illustrated in FIG. 29. Any suitable binder strap material may be connected from one flange 170a across the top of the weapons to the opposite flange 170b and drawn tight so as to secure the weapons in place. The straps will also tend to support the side portions 154a and 154b against any very high bending moments acting on the joint between the side portions and the base portion which may be encountered during loading or shipping. The cradles can then be easily handled by either a forklift truck or a sling harness. The latter capability is particularly useful when the weapons are transported by ship, as is often the case. The cradles can be stacked in the manner illustrated in dotted outline in FIG. 29 during transport and storage at the prestaging areas. When the cradles 150 have been emptied, they can be stacked in closely nesting relationship for return to the factory. The nested stack can also be handled by a standard forklift vehicle or sling harness and occupies a relatively small volume and is of minimum weight.

From the foregoing description of preferred embodiments of the invention, it will be appreciated that a unique and highly useful materiel handling device has been described. The cradle 10 is typically about three feet square, weighs about 50 pounds when fabricated from sheet aluminum and about 90 pounds when fabricated from sheet steel, yet is capable of handling substantially all airborne weapons now used in tactical operations by the United States, including three 1000# bombs. This compares with a weight of about 350 pounds for the cradles heretofore used for the same purpose. The reduced weight is of prime importance in that the cradles can be easily handled by one man, as opposed to requiring mechanized equipment. Further, the reduced weight is very important when considering the long distances which the cradles must be transported to advanced bases, either by air, ship, rail or truck. The cradles 10 may also be stacked in closely nesting relationship so as to greatly reduce the volume required for an equivalent number of the previously used cradles. For example, each additional cradle added to the stack increases the height of the stack by less than one inch. Thus, fifty of the cradles 10 can be placed in a single stack three feet square and less than six feet high. An equivalent number of cradles of the type heretofore used would result in a stack about thirty feet square and ten feet high. Similar advantages can be otbained from the larger cradles 150 used to handle the weapons in bulk. In addition, the cradles 10 have no moving parts and therefore have improved reliability. The cradles can be handled by hand and thus substantially simplify and increase the speed of the weapons loading operation.

Although the specific embodiments of the invention described in the foregoing specification are particularly adapted for use in the transport and loading of airborne weapons, it is to be understood that the invention is applicable to materiel handling generally and that the basic concept, with various modifications, can be advantageously used to handle a wide variety of objects either singly or in bulk. The type of cradle described herein is prarticularly useful in handling elongated, cylindrical objects such as logs, posts, cylinders for compressed gas, and the like. However, it will be noted that by merely enclosing the two opposite ends of the cradle 150 with outwardly sloping end walls made of relatively thin sheet material, the cradle could be used to handle bulk particulate material of substantially any grain size by either a forklift or sling harness while still retaining nestability for stacking. The height of the sides can be increased or decreased as required for various applications.

Although preferred embodiments of the invention have been described in detail, it is to be understood that various changes, substitutions and alterations can be made therein without departing from the spirit and scope of the invention as defined by the appended claims.

What is claimed is:

1. An ordnance handling system comprising:
    an ordnance including a single rack having means for attachment to an overhead support and having forward and aft attaching members, a forward weapon secured to the forward attaching member and an aft weapon secured to the aft attaching member;
    a first forklift adapter cradle for supporting the forward weapon of the ordnance;
    a second forklift adapter cradle for supporting the aft weapon of the ordnance; and
    a forklift vehicle having first and second parallel forks mounted on a bar and spaced on the bar to lift the first and second adapter cradles, respectively, when the first and second adapter cradles are supporting the forward and aft weapons of the ordnance.

2. The system defined in claim 1 wherein the first and second adapter cradles are each comprised of a sheet conformed to provide a base portion and at least one side portion extending at an angle from a longitudinally extending edge of the base portion and having a plurality of common corrugations extending transversely of the base portion and the side portion such that the corrugations and the side portion stiffen the adapter about the longitudinal and transverse axes.

3. The system defined in claim 1 wherein there is a cluster of three weapons mounted one below and one on each side of the rack at the forward and at the aft positions, and each adapter cradle comprises a unitary sheet of material conformed to provide a generally rectangular base portion and two opposite, generally parallel side portions extending upwardly and outwardly from the base portion at angles, the base portion and side portions having comon corrugations extending transversely of the base portion and side portions with alternate upper and lower plate portions interconnected by web portions, the upper plate portions having a cross-sectional configuration complementing the configuration of the cluster of weapons, whereby the corrugations will rigidify the angles between the base portion and the side portions and the corrugations and the junctions between the side portions and the base portion will stiffen the cradle.

References Cited

UNITED STATES PATENTS

| | | | |
|---|---|---|---|
| 2,103,649 | 12/1937 | Sullivan | 214—10.5 |
| 2,119,112 | 5/1938 | Mitchell | 214—10.5 |
| 2,451,226 | 10/1948 | Kemp | 214—621 X |
| 3,268,097 | 8/1966 | Armington et al. | 214—730 X |

GERALD M. FORLENZA, Primary Examiner

R. J. SPAR, Assistant Examiner

U.S. Cl. X.R.

89—1.5